United States Patent [19]

Guillemot

[11] 4,301,685
[45] Nov. 24, 1981

[54] DIGITAL PRESSURE-MEASURING DEVICE

[75] Inventor: Philippe Guillemot, Paris, France

[73] Assignee: Mecilec, Paris, France

[21] Appl. No.: 52,980

[22] Filed: Jun. 28, 1979

[30] Foreign Application Priority Data

Jun. 30, 1978 [FR] France ................................ 78 19575
Jul. 18, 1978 [FR] France ................................ 78 21215

[51] Int. Cl.³ ............................................... G01L 9/08
[52] U.S. Cl. ................................... 73/723; 73/DIG. 4
[58] Field of Search ................. 73/716, 720, 701, 717, 73/723, DIG. 4

[56] References Cited

U.S. PATENT DOCUMENTS 3,397,581  8/1968  Bush ...................................... 73/716

Primary Examiner—Donald O. Woodiel
Attorney, Agent, or Firm—Michael J. Striker

[57] ABSTRACT

A pressure-measuring device which operates in digital representation comprises:

a first chamber subjected to the pressure to be measured;

a second chamber subjected to a reference pressure and connected to the first chamber through at least one opening fitted with a valve;

a device for measuring the difference both in magnitude and in sign between the pressures prevailing respectively within the first and second chambers, said device being intended to deliver an electrical signal which is a function of said difference;

a circuit for detecting the instants at which said difference attains a predetermined increment $+\Delta P$ or a predetermined decrement $-\Delta P$ and for detecting instants at which said difference becomes zero;

an element connected to said circuit for initiating the opening of the valve or valves when the difference attains the values $\pm \Delta P$ and of initiating closure of the valve or valves when said difference becomes zero;

bidirectional counting mechanism connected to said circuit in order to account for the number of increments $+\Delta P$ obtained and reduced by the number of decrements $-\Delta P$ obtained.

1 Claim, 2 Drawing Figures

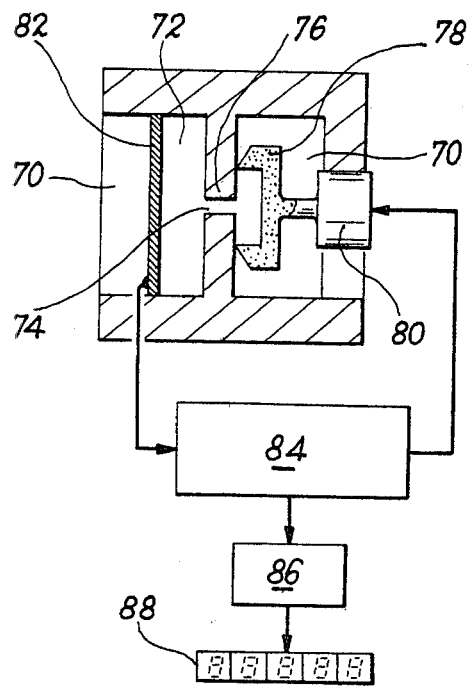
FIG. 1
FIG. 2
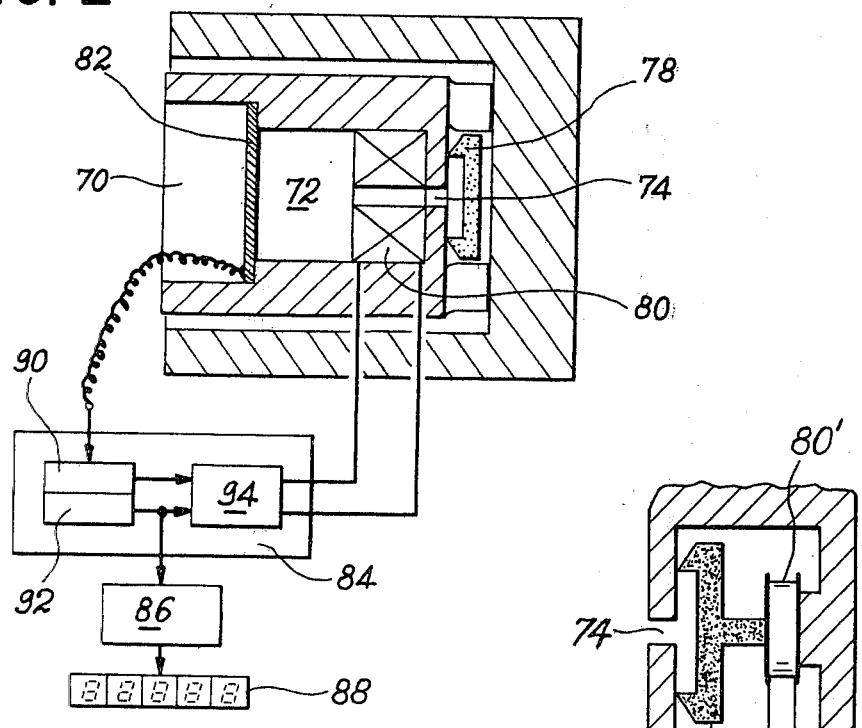
FIG. 3

DIGITAL PRESSURE-MEASURING DEVICE

This invention relates to a digital pressure-measuring device. The invention finds an application in the construction of pressure transducers for use in either gases or liquids but also in the design of transducers for the measurement of force, displacement, acceleration and so forth. The invention finds a preferred application in the construction of pressure transducers which can replace the pressure gages currently employed in underwater drilling sites and also in the construction of instruments for measuring the depth of immersion of an underwater diver.

The majority of known pressure-measuring instruments comprise an enclosure subjected to a fixed reference pressure and a deformable interface in contact with the fluid whose pressure is to be measured. The most simple and most characteristic example from this point of view is the diaphragm-type pressure gauge with capsule and deformable wall.

These instruments are subject to a number of disadvantages and two of these will now be mentioned.

In the first place, the existence of a fixed partial pressure enclosure has the effect of subjecting the interface to increasingly high stresses when the pressure to be measured rises. The range of operation of these instruments is therefore necessarily limited at higher values. A further drawback lies in the basic design concept of these instruments which can only deliver a signal having an analog character: deflection of a pointer, amplitude of an electric signal, height of a column of liquid, and so forth. At the present time, however, signals of a digital nature are more and more frequently employed, either when it is desired to indicate the result of measurement directly in digital representation or when it is necessary to carry out a preliminary treatment by means of computing means which operate in the digital code with very rare exceptions. Instruments of the prior art must therefore be associated with analog-to-digital converters, thus clearly increasing the cost and complicating the characteristics of equipment.

The precise aim of the present invention is to provide a pressure-measuring device which overcomes these disadvantages since its range of utilization is not limited at higher values and the signal delivered by the instrument is directly available in digital representation.

This aim is achieved in accordance with the invention by making use of a chamber in which a variable reference pressure prevails (the pressure being no longer fixed as in the prior art), this pressure being intended to follow the variations in pressure to be measured by successive increments or decrements. According to the invention, the number of increments or decrements experienced by the reference pressure is then measured and this number gives the variation in pressure with respect to the initial value. As can readily be understood, it is thus possible to overcome the two disadvantages mentioned above, on the one hand by preventing any appreciable unbalance between the pressure to be measured and the reference pressure and consequently removing stresses and, on the other hand, by delivering the desired information directly in the form of a number.

In more exact terms, the present invention is directed to a pressure-measuring device which essentially comprises:

a first chamber subjected to the pressure to be measured, a second chamber subjected to a reference pressure and connected to the first chamber through at least one opening fitted with a valve, means for measuring the difference both in magnitude and in sign between the pressures prevailing respectively within the first and second chambers, said measuring means being intended to deliver an electrical signal as a function of said difference, a circuit for detecting the instants at which said difference attains a predetermined increment $+\Delta P$ or a predetermined decrement $-\Delta P$ and for detecting the instants at which said difference becomes zero, means connected to said circuit for initiating the opening of the valve or valves when the difference attains the values $\pm \Delta P$ and for initiating closure of the valve or valves when said difference becomes zero, bidirectional counting means connected to said circuit and adapted to account for the number of increments $+\Delta P$ obtained and reduced by the number of decrements $-\Delta P$ obtained.

The valves employed can be of any known type provided that they have the design function of establishing a communication between two chambers when the difference between the pressures prevailing therein attains a predetermined value and sign. By way of example, the valves can be of a wholly mechanical type and can comprise a moving component applied to a fixed component by a spring; but they can also be of the magnetic type and comprise a permanent magnet and a component of magnetic material. Said valves can also be of the composite type, of the magnetic and mechanical type. Finally, they can be constituted by piezoelectric means associated with a nozzle.

The means for measuring the difference both in magnitude and in sign between the pressures prevailing respectively within the first and the second chambers and for delivering a signal which is a function of said difference can be of any known type such as, for example, the strain gage type, the piezoelectric, piezoresistive or magnetic type, and so forth.

Shaping of the electrical signals emitted and counting of said signals after shaping does not give rise to any particular problem for anyone versed in the art and all means for performing this function come within the scope of the invention, especially binary or bidirectional counting devices.

The distinctive features and advantages of the invention will in any case be more clearly brought out by the following description of exemplified embodiments which are given by way of explanation without any limitation being implied, reference being had to the accompanying drawings in which:

FIG. 1 is a general diagram of the device according to the invention;

FIG. 2 illustrates a particular mode of construction of the transducer according to the invention; and FIG. 3 illustrates a particular valve usable in the device according to the invention.

The device shown in FIG. 1 comprises a first chamber 70 subjected to the pressure $P_e$ to be measured, and a second chamber 72 subjected to a pressure $P_r$ or so-called reference pressure. Said second chamber is connected to the first by means of an opening 74 pierced in a partition-wall 76. Said opening is fitted with a valve 78, opening of said valve being controlled by a means 80. The chambers 70 and 72 are separated by an element 82 which is sensitive to the pressure difference between the two chambers. By way of example, said element is a strain gage or a piezoresistive strip and delivers an electricl signal which is a function of said difference. Said signal is directed to a detection circuit 84 which is capable of detecting the instants at which the pressure different $P_e - P_r$ attains a value $+\Delta P$ or a value $-\Delta P$ and the instants at which said difference is zero. Each time the difference attains one of the values $\pm\Delta P$, the circuit 84 delivers a signal which is applied to the means 80 for causing the valve 78 to open. When the difference returns to zero, the circuit 84 delivers a signal which is capable of initiating closure of the valve. The device is completed by a bidirectional counter 86 which is capable of accounting for the number of increments $+\Delta P$ reduced by the number of decrements $-\Delta P$ which are observed at the time of variations in the pressure to be measured. The number obtained is indicated both in magnitude and in sign by display means 88.

The operation of this device is as follows. At equilibrium of the pressures $P_e$ and $P_r$, the circuit 84 delivers a signal which is capable of maintaining the valve 78 in the closed state. The chambers 70 and 72 are therefore isolated from each other. When the pressure $P_e$ to be measured increases, a pressure difference appears between the two faces of the means 82 and a signal is received by the circuit 84. By comparison means which are well known, the circuit 84 detects the instant at which said pressure difference attains the value $+\Delta P$. At this instant, said circuit emits a signal which is applied to the means 80, thus causing the valve 78 to open. The two chambers 70 and 72 are then put into communication with each other through the opening 74 and their pressures are equalized. The reference pressure $P_r$ then increases by a quantity $+\Delta P$ and becomes equal to the pressure $P_e$. The difference $P_e - P_r$ is accordingly restored to zero. The instant at which said difference becomes zero is detected by the circuit 84 which emits a signal for initiating closure of the valve 78. The same process again takes place at the time of a further increase in the pressure $P_e$ by a value $+\Delta P$. The bidirectional counter 86 receives a number of pulses having a suitable sign and corresponding to the number of increments $+\Delta P$ detected by the circuit 84.

Should the pressure $P_e$ decrease, a similar process takes place but in this case involves detection of the instants at which the pressure difference $P_e - P_r$ attains the value $-\Delta P$ whilst the bidirectional counter 86 again receives a number of pulses (but of opposite sign) corresponding to the number of decrements $-\Delta P$ detected by the circuit 84.

The particular embodiment of the device shown in FIG. 2 is essentially distinguished on the one hand by the use of a coil 80 which provides a means for controlling the valve 78 and is supplied with current through the circuit 84 and, on the other hand, by the use of a valve constituted by a permanent magnet. Depending on the direction of the current flowing through the coil 80, the magnet which constitutes the valve is attracted by the coil (thereby closing the opening 74 and isolating the two chambers 70 and 72) or repelled by this latter (thereby freeing the opening and establishing a communication between the two chambers).

In the embodiment illustrated in FIG. 2, the circuit 84 comprises two circuits 90 and 92 respectively for detecting a zero pressure difference and a pressure difference equal to $\pm\Delta P$. These circuits control a current source 94 for supplying the coil 80. The element 82 which is responsive to the pressure difference can be constituted by a strain gage placed in one of the arms of a Wheatstone bridge.

The following table summarizes the operation of the device and indicates the state of the essential elements in the different situations. These elements are designated by the reference numerals 90 (detection of zero), 92 (detection of $\pm\Delta P$), 86 (bidirectional counter), 94 (coil supply circuit), 80 (coil), 78 (valve). In accordance with conventional practice, "1" denotes the "active" or "open" state and "0" denotes the "passive" or "closed" state.

This table shows that, in cases 3 and 7, the threshold detection means 92 initiates opening of the valve whilst the means 90 has no influence; in cases 5 and 9, the zero detection means 90 initiates closure of the valve whilst the means 92 has no influence.

The embodiment illustrated in FIG. 3 is the same as that in FIG. 1, except that the valve 78 has its operation controlled by piezoelectric means 80'.

It is apparent from the foregoing description that the transducer according to the invention offers a large number of advantages over the transducers of the prior art, viz:

it provides intrinsically digital operation and therefore no longer calls for a converter;

the stresses to which the different components of the device are subjected are equal at a maximum to the difference $\Delta P$ which is always of very low value, irrespective of the value of the pressure to be measured;

although there does exist a lower limit of the measurable pressure range (this limit being equal to $\Delta P$), there does not on the other hand exist any upper limit.

The device according to the present invention offers a further advantage, however, in that it permits an adjustment of the increment $\Delta P$ by electronic means which virtually consist in adjusting switching thresholds and does not present any problem in the present state of the art. The proportion of mechanical components is therefore reduced to a minimum in order to make profitable use of electronic means which are much more reliable and convenient.

| CASE | 90 | 92 | 86 | 94 | 80 | 78 | EFFECT |
|---|---|---|---|---|---|---|---|
| 1/$P_e = P_r$ | 1 | 0 | $P_r$ | 0 | 0 | 0 | Valve closed |
| 2/$P_e < P_r + \Delta P$ | 0 | 0 | $P_r$ | 0 | 0 | 0 | Valve closed |
| 3/$P_e = P_r + \Delta P$ | 0 | 1 | $P_r + 1$ | 1 | 1 | 1 | Opening of valve |
| 4/$P_e < P_r + \Delta P$ | 0 | 0 | $P_r + 1$ | 1 | 1 | 1 | Balancing |
| 5/$P_e = P_r$ | 1 | 0 | $P_r + 1$ | 0 | 0 | 0 | Closure of valve |
| 6/$P_e < P_r - \Delta P$ | 0 | 0 | $P_r$ | 0 | 0 | 0 | Valve closed |
| 7/$P_e = P_r - \Delta P$ | 0 | 1 | $P_r - 1$ | 1 | 1 | 1 | Opening of valve |
| 8/$P_e < P_r - \Delta P$ | 0 | 0 | $P_r - 1$ | 1 | 1 | 1 | Balancing |
| 9/$P_e = P_r$ | 1 | 0 | $P_r - 1$ | 0 | 0 | 0 | Closure of valve |

What is claimed is:

1. A digital pressure-measuring device, comprising a first chamber subjected to the pressure to be measured; a second chamber subjected to a reference pressure and connected to the first chamber through at least one opening fitted with a valve which is constituted by a piezoelectric element associated with a nozzle; non-mechanical means for measuring the difference both in magnitude and in sign between the pressures prevailing respectively within the first chamber and the second chamber, said means being adapted to deliver an electrical signal as a function of said difference; a circuit for detecting the instants at which said difference attains a predetermined small increment $+\Delta P$ and a predetermined small decrement $-\Delta P$ and for detecting the instants at which said difference becomes zero; means connected to said circuit and capable of initiating the opening of the valve or valves when the difference attains the values $\pm \Delta P$ and of initiating closure of said valve or valves when said difference becomes zero; and bidirectional counting means connected to said circuit and adapted to account for the number of increments $+\Delta P$ obtained and reduced by the number of decrements $-\Delta P$ obtained.

* * * * *